United States Patent [19]

Skinner et al.

[11] Patent Number: 5,529,312
[45] Date of Patent: Jun. 25, 1996

[54] GASKET AND METHOD OF CASTING SAME IN A WALL

[75] Inventors: James W. Skinner, Fort Wayne; Michael R. Miller, Churubusco; Ronald W. Neuhaus, Fort Wayne, all of Ind.

[73] Assignee: Press-Seal Gasket Corporation, Fort Wayne, Ind.

[21] Appl. No.: 198,828

[22] Filed: Feb. 18, 1994

[51] Int. Cl.⁶ .................................. F16J 9/00; F16L 49/00
[52] U.S. Cl. ................... 277/9.5; 277/189; 277/212 FB; 285/230
[58] Field of Search ............................ 277/9.5, 181, 186, 277/189, 207 A, 212 FB, 101; 285/230, 231, 23

[56] References Cited

U.S. PATENT DOCUMENTS

| | | |
|---|---|---|
| 3,510,140 | 5/1970 | Hermann ............................ 277/207 A |
| 3,758,066 | 9/1973 | Skinner et al. . |
| 3,866,925 | 2/1975 | Maimstram et al. .................... 285/230 |
| 3,874,063 | 4/1975 | Skinner et al. . |
| 3,973,783 | 8/1976 | Skinner et al. . |
| 4,018,461 | 4/1977 | Bram ................................... 277/207 A |
| 4,103,901 | 8/1978 | Ditcher . |
| 4,126,317 | 11/1978 | Bainard ................................... 277/9.5 |
| 4,186,931 | 2/1980 | Anderson . |
| 4,199,157 | 4/1980 | Skinner et al. . |
| 4,333,662 | 6/1982 | Jones . |
| 4,350,351 | 9/1982 | Martin . |
| 4,690,414 | 9/1987 | Haaland ............................... 277/207 A |
| 4,693,482 | 9/1987 | Daigle et al. . |
| 4,809,994 | 3/1989 | Skinner et al. . |
| 4,916,799 | 4/1990 | Skinner et al. . |
| 4,923,432 | 5/1990 | Porter ................................. 277/212 FB |
| 4,961,599 | 10/1990 | Delery, Jr. et al. . |
| 5,094,894 | 3/1992 | Schafferus et al. . |
| 5,114,162 | 5/1992 | Ditcher . |

*Primary Examiner*—Daniel G. DePumpo
*Attorney, Agent, or Firm*—Barnes & Thornburg

[57] ABSTRACT

An annular gasket is disclosed which may be used in concrete manhole structures and pipe structures. An embodiment of the invention includes an annular body positioned to lie in a joint between two surfaces such as a wall and an outer surface of a pipe or an inner surface of one pipe and the outer surface of another pipe, structure for anchoring the body within the wall or pipe so that the body lies adjacent the wall or pipe, a sleeve having first and second folds, structure for coupling the sleeve to the body so that the sleeve is movable between a folded position adjacent the body and an unfolded position around the outer surface of the pipe, and structure for the securing the sleeve in the folded position.

34 Claims, 8 Drawing Sheets

GASKET AND METHOD OF CASTING SAME IN A WALL

BACKGROUND AND SUMMARY OF THE INVENTION

The present invention relates to a gasket cast within a wall defining an opening for sealing a joint between the wall and an outer surface of an annular member extending through the opening. More particularly, the present invention relates to a gasket cast within a wall defining an opening in a manhole or bell end of a pipe that is folded so as to be protected prior to installation of an annular pipe within the opening and unfolded around an outer surface of the annular pipe to seal the joint between the wall and the annular pipe and to methods of installing such gasket within the wall and sealing the joint between the wall and the outer surface of the annular pipe.

In sewer lines, manholes are ordinarily installed at various intervals including locations where the sewer line changes elevation or direction. Manholes are typically formed in molds from a settable material such as concrete. The mold may form one or more annular openings in the manhole in which sewer pipes are positioned to lie adjacent a wall of the manhole defining that particular opening. The joint between the manhole wall and outer surface of the sewer pipe is sealed to prevent ground water from entering the manhole and to prevent contents of the manhole, such as sewage and water, from leaking out of the manhole. When ground water enters the manhole, it often brings in sediment which collects in the sewer over time. Such sediment causes clogs and inhibits the ability of the manhole to carry water. In addition, infiltration of ground water also increases the total volume of sewage flow through sewer lines which increases the required size of pipe needed as well as the expense of treatment of the total sewage flow. When the contents of the manhole leak, they can pollute the ground water.

Various types of gaskets for sealing joints between pipes and manholes are known. Often these gaskets are formed from an elastomeric material that is either inserted in an opening in the manhole and expanded via a ring or physically embedded in a portion of a wall adjacent the opening in the manhole. These gaskets typically provide at least one extending projection or sleeve (also called a boot) that surrounds and engages an outer wall or surface of a pipe extending through the gasket and the opening.

Expanded gaskets require rings that exert an outwardly, radially directed force on an inner surface of a gasket positioned within the opening to compress the gasket against a manhole wall defining the opening. These rings increase both material and labor installation costs associated with sealing the joint between the manhole wall and pipe. Material costs are increased because these rings are somewhat complicated corrosion-resistant metal structures that must be manually fabricated or are molded plastic structures that are made, at least in part, from high strength, expensive compositions. Labor costs are increased because installation and expansion of such rings to effect a seal requires maintaining proper alignment of the ring and use of equipment such as mechanical expansion units. In addition, seal failure will occur if the ring is improperly installed.

Embedded gaskets resolve the above-described problems associated with expanded gaskets. Embedded gaskets include those that are compressed between the manhole wall and outer wall or surface of the pipe as well as those that include sleeves or boots that are compression clamped around the outer wall or surface of the pipe. Embedded gaskets solve the expense problem associated with the manufacture and installation of expansion gaskets because, at most, only a relatively inexpensive clamp must be attached around the outside of the sleeve of the gasket to effect a seal. Embedded gaskets also allow a larger diameter of pipe to be inserted into an opening in a manhole than expanded gaskets because a separate ring is unnecessary. As is known, outside pipe diameter size can increase up to a certain point at which an expanded gasket can no longer be used for a particular sized manhole because the width of a wall defining an opening in the manhole will no longer be large enough to support the expansion ring. This means that a next, larger sized, more expensive manhole must be used for the larger diameter pipe.

A further advantage of compression embedded gaskets over expanded gaskets is that they can be set in the wall of the manhole defining the opening so that they must be released before being used. Releasably setting a gasket within the wall helps protect it against damage during shipment and handling. An advantage of sleeved embedded gaskets over compression embedded gaskets is that they can be less expensive because they can be formed from a thinner mass of elastomer. The same is not always true of compression embedded gaskets which often rely upon an extra mass of elastomer for compression. Another advantage of sleeved embedded gaskets is that they do not require as high a precision joint between the inside diameter of the manhole wall and the outside diameter of the pipe to effect a seal. Compression embedded gaskets only work within a small range of tolerances between these two diameters. If either of these diameters is outside the tolerance range, a compression embedded gasket will not properly seal. A further advantage of sleeved embedded gaskets is that they allow for a greater amount of lateral and vertical adjustment and deflection of an inserted pipe than do compression embedded gaskets. This means that greater amounts of pipe movement can occur while still maintaining a positive, fluid-tight seal. An embedded gasket that included a sleeve that is releasably secured to a manhole wall would be a welcome improvement. Such as gasket would be protected during shipping and handling while, at the same time, exploiting the advantages of sleeved embedded gaskets over compression embedded gaskets.

The opening defined by a wall of a manhole and a gasket embedded in the wall may be formed through the use of a mold and a settable material such as concrete. However, before the mold can be removed, sufficient time must pass to allow the settable material to cure or harden. Mass production thus requires several of these forms because of this curing time. This presents a problem because such molds are expensive to manufacture and often difficult to obtain on short notice. A less expensive method of embedding or casting a gasket within a wall defining an opening particularly suited for mass production or short notice would thus be a welcome improvement.

Non-precision joints between pipes, such as bell and spigot end pipes, are often sealed with a filler such as concrete and caulking. These fillers may allow ground water to enter the pipes or allow the contents of the pipes, such as sewage and water, to leak out. When ground water enters the pipes, it often brings in sediment which collects in the pipes. Such sediment can clog the pipes and inhibit their ability to carry away sewage and water. When the contents of the pipes leak, they can pollute ground water.

Sealing of precision joints between bell and spigot ends of pipes is typically achieved through the use of an elastomeric gasket between the joint. However, these precision joints may become out-of-tolerance over time as a result of dimensional changes of the pipe-making equipment during pipe manufacture or movement of one or more of the pipes due to, for example, settling of material underlying a pipe. Once the joints become out of tolerance, the above-described leakage and in-flow problems can occur.

A gasket that could be used in both non-precision and precision pipe joints solved the above-described problems would be a welcome improvement. Accordingly, the present invention includes a gasket for sealing a joint between a wall defining an opening and an outer surface or wall of an annular member. The gasket of the present invention is embedded or cast within the wall defining the opening and includes a sleeve that can be folded adjacent the wall defining the opening and unfolded around the outer surface or wall of the annular member. The folded position helps protect the sleeve against damage during shipping and handling. The unfolded position provides a positive, substantially fluid-tight seal around an outer surface or wall of the annular member through only the use of clamp around a portion of the sleeve and annular member.

An embodiment of the gasket includes an annular body or base cast within and adjacent a wall of a manhole defining an opening in the manhole. The body or base is secured within the wall by one or more anchoring projections which, in preferred embodiments, include keylocks. In one preferred embodiment, the body or base is configured to have a length substantially equal to a width of the casting appliance (e.g., a fiberglass support plug). This helps prevent the settable material from which the wall and manhole are made from entering the gasket. An annular sleeve is coupled to the body and can be unfolded around an outer surface or wall of a pipe positioned to lie within the opening in the manhole. The body and sleeve, together, provide a positive, substantially fluid-tight seal of the joint between the manhole wall and outer surface or wall of the pipe. The sleeve includes first and second webs or skirts. The first web or skirt is connected to the second web or skirt by a hinge or fold and the second web or skirt is connected to the first web or skirt and body by hinges or folds. The hinges allow the first and second webs to be folded so that the first web lies adjacent the body in the folded position and the second web lies adjacent the first web in the folded position. The hinges or folds may be made from reduced portions or enervations in the sleeve and body.

An abutment member may be formed on a distal end of the first web that helps retain a clamp against lateral movement along the sleeve. In preferred embodiments, the abutment member includes an annular bead. A recess may be formed in the body or, alternatively, a portion of the manhole wall that captures the abutment member in the folded position to help retain the sleeve in that position. The abutment member must be manually removed from the recess to unfold the sleeve. The recess is configured to have dimensions that generally conform to the abutment member.

Another embodiment of the gasket of the present invention includes an annular body cast within and adjacent either an inside or outside wall of a bell end of an annular first pipe defining an opening in the first pipe. An annular sleeve or sheet is coupled to the body and can be unfolded around an outer surface or wall of an annular second pipe, a spigot end of which is positioned to lie within the opening in the bell end. The body and sleeve, together, provide a positive, substantially fluid-tight seal of a joint between the two pipes. The sleeve or sheet may also be folded adjacent the body to protect the sleeve from damage during shipping and handling. The sleeve or sheet may include a plurality of folds that allow it to be moved between these two positions.

An abutment member may be formed on a distal end of the sleeve that helps retain a clamp against lateral movement along the sleeve. In preferred embodiments, the abutment member includes an annular bead. A recess may be formed in the bell end of the first pipe that captures the abutment member or, alternatively, a portion of the sleeve in the folded position to help retain the sleeve in that position. The abutment member or sleeve must be manually released from the recess in order to unfold the sleeve. The recess is configured to have dimensions that generally conform to either the abutment member or that portion of the sleeve that is positioned to lie therein.

The body may include a receptacle in which the sleeve or sheet is positioned to lie when folded. One or more anchoring projections, such as keylocks, may be used to help secure the receptacle within the bell end of the first pipe.

The present invention also relates to a new method of casting a gasket of the present invention into a wall defining an opening in a manhole. The method includes the steps of cutting a first end of an annular member to have a first arc generally equivalent to a first arc of the inside diameter of the manhole and cutting a second end of the annular member to have a second arc generally equivalent to a second arc of an outside diameter of the manhole. The gasket is then positioned on an outer surface of the cut annular member. One or more spacers are next positioned on the outer surface of the cut annular member on both sides of the gasket. The cut annular member with gasket and spacers attached is then positioned within a mold used to form the wall of the manhole. Next, settable material is poured into the mold and cured so that the gasket is cast within the wall formed by the mold. Finally, the spacer, annular member, and mold are removed so that the gasket is positioned adjacent the wall of the manhole in a folded position.

The annular member may include a plastic pipe and the spacer may include a foam filler gasket made from materials such as foam water pipe insulation, rubber hose, and foam tape. The spacers may be formed a predetermined length to position the gasket generally in the center of the wall. In addition, the annular member may be cut a predetermined sufficient length to reduce bleed-by of the settable material during casting and curing.

The gasket of the present invention provides a method of sealing a joint between a wall defining an annular opening in a first member and an annular outer surface of a second member. The method includes the steps of forming an annular elastomeric gasket having a body portion, a radially directed anchoring projection, and a sleeve coupled to the body that can be moved between folded and unfolded positions. The formed gasket is positioned, with the sleeve folded, in an annular mold and the first member is cast from settable material poured in the mold to embed the anchoring projection in a wall of the formed first member. This positions the body of the gasket adjacent the wall. Next, the settable material is cured and the annular mold removed to provide an annular opening. The sleeve is then unfolded in an outwardly directed sealing position away from the body and a second member is inserted through the sleeve to form a positive, substantially fluid-tight seal between the wall of the first member and the outer surface of the second member.

The sleeve may be cast in the wall so that it is necessary to release it prior to unfolding the sleeve. The forming step may further include the steps of extruding the gasket in a generally straight condition, cutting the gasket at a length of approximately an outside diameter of the second member and joining the first and second ends of the cut gasket, via such conventional means as vulcanization, to form an annular shape. The body may be further formed so that it has a length substantially equal to a width of the adjacent wall of the first member.

The first annular member may be a manhole or, alternatively, a bell end of a pipe. When the first member includes a bell end of pipe, the body may include a receptacle to which the sleeve is coupled and in which the sleeve is positioned to lie in the folded position.

Other objects, advantages and novel features of the present invention will become apparent from the following detailed description of the invention when considered in conjunction with the accompanying drawings.

DETAILED DESCRIPTION OF THE DRAWINGS

Figure 1:
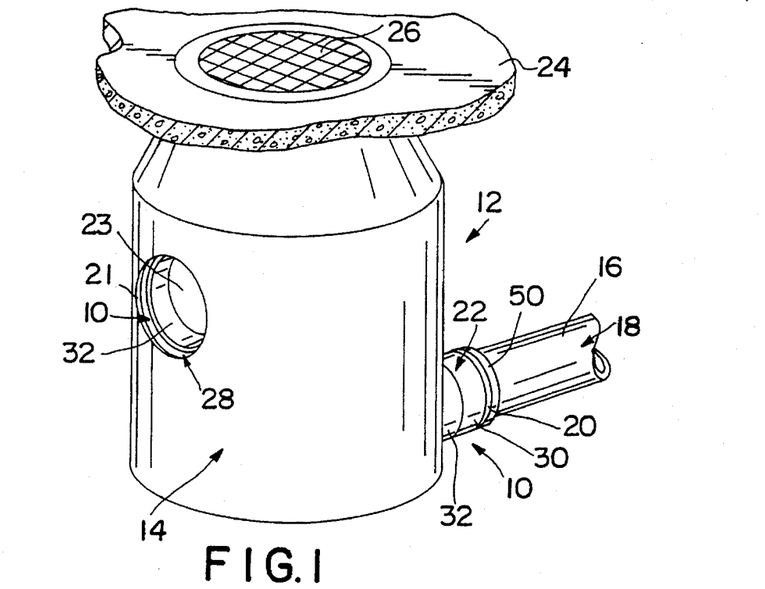
FIG. 1 shows a perspective view of a sanitary sewer that includes a manhole, a pipe, and two cast-in gaskets of the present invention, one of which is illustrated in an unfolded position sealing a joint between a wall of the manhole defining an opening therein and the pipe positioned to lie within that opening and another one of which is illustrated in a folded position adjacent another wall defining a different opening in the manhole.

A gasket 10 of the present invention for use in a sanitary sewer 12 is shown in FIG. 1. Gasket 10 seals the joint between a wall defining an opening in a manhole 14 and an outer wall or surface 16 of a pipe 18 positioned to lie within the opening in manhole 14. Although not shown, gasket 10 may be used to seal joints of a storm sewer as well, in which case it would unfold on the inside of manhole 14 rather than the outside.

A clamp 20 secures an unfolded sleeve or boot 22 of gasket 10 around outer wall or surface 16 of pipe 18 to effect a positive, substantially fluid-tight seal of the joint between the wall of the manhole and outer wall or surface 16 of pipe 18. Sleeve 22 can be folded adjacent a wall 21 defining an opening 23 in manhole 14 when not in use as shown in FIG. 1. Folding sleeve 22 of gasket 10 when not in use helps protect gasket 10 from damage during shipping and handling of manhole 14. Sewer 12 is shown as being positioned below pavement 24 which has an opening that provides access to an interior of manhole 14. The opening in pavement 24 is covered by a manhole cover 26.

Figure 2:
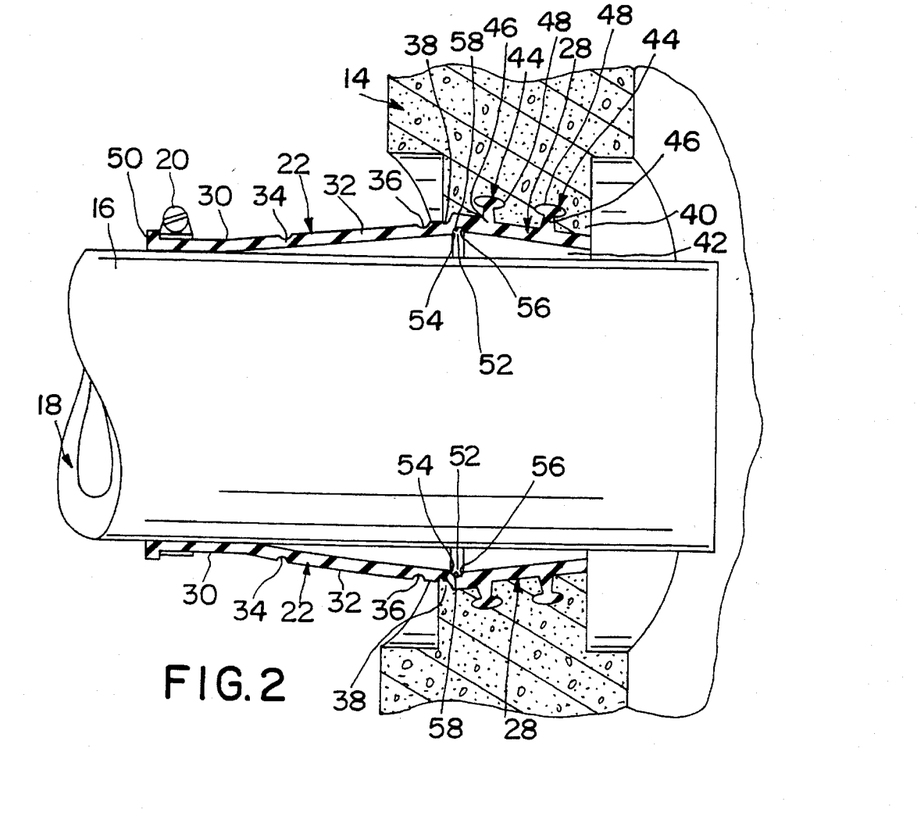
FIG. 2 is a cross-sectional view that shows the gasket of the present invention in a clamped, unfolded position sealing the joint between a wall of the manhole defining an opening therein and an outer wall or surface of a pipe that is positioned to lie within the opening.

Gasket 10 includes an annular body or base 28, an annular first web or skirt 30, and an annular second web or skirt 32 as shown in FIG. 2. First and second webs 30 and 32 form sleeve 22. First web 30 is coupled to second web 32 by a hinge or fold 34 and second web 32 is connected to body or base 28 via hinges or folds 36 and 38. Annular body 28 is secured within manhole wall 40, which defines manhole opening 42 through which pipe 18 is inserted, via keylocks or anchoring projections 44 that radially extend from body 28. Each keylock or anchoring projection 44 includes a leg 46 coupled to and extending from body 28 and a flange 48 formed on a distal end of leg 46 and extending on either side of leg 46. Although a plurality of keylocks or anchoring projections 44 are shown, it is to be understood that a single keylock or anchoring projection can also be used.

Clamp 20 is secured against lateral movement along first web 30 by an abutment member 50 formed on a distal end of first web 30 opposite hinge or fold 34. In preferred embodiments, abutment member 50 is an annular bead. However, for example, abutment member 50 may also include one or more raised beads or similar structure.

Figure 3:
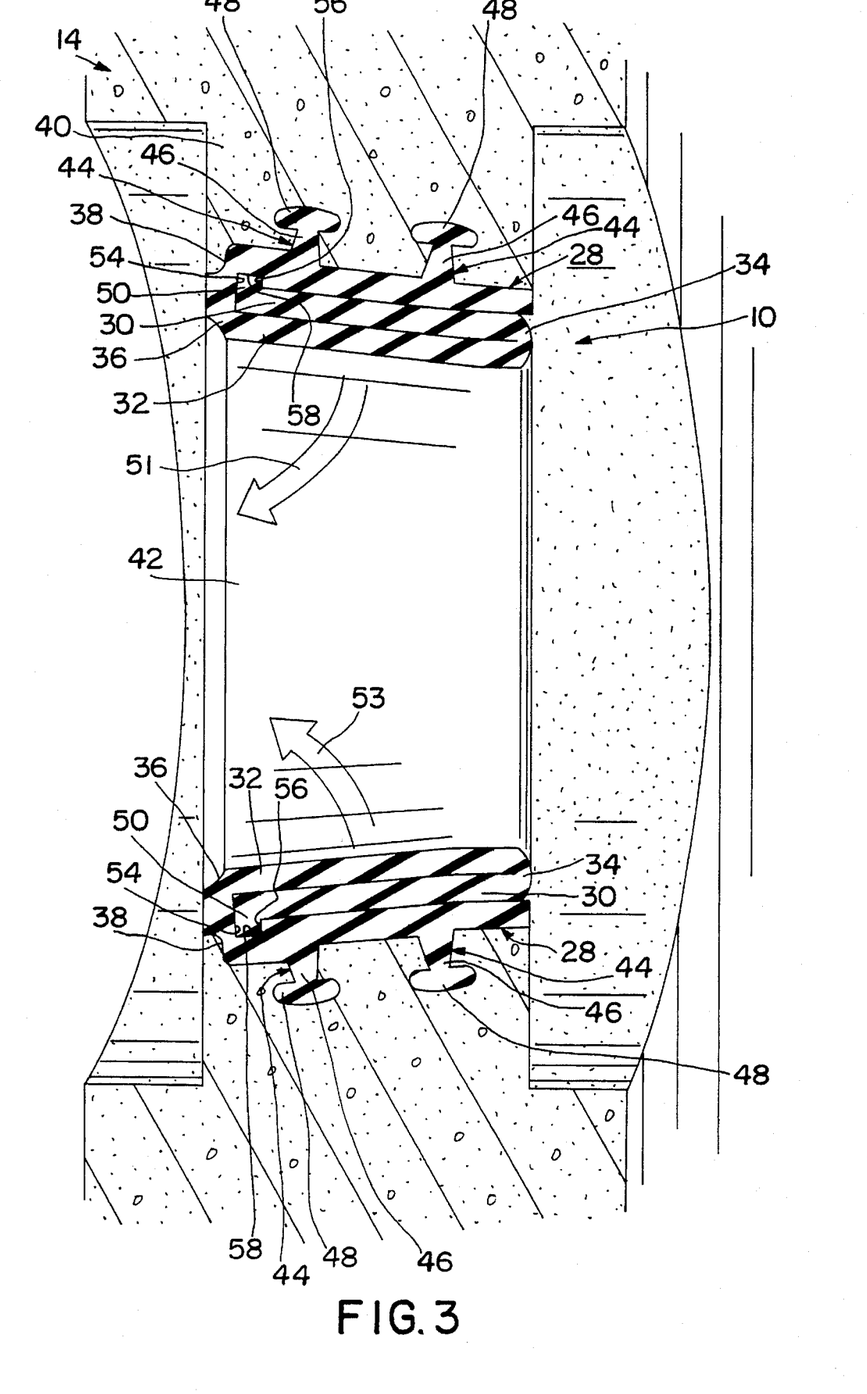
FIG. 3 is a cross-sectional view of the gasket of the present invention cast within and folded adjacent a wall defining an opening in a manhole taken along line 3—3 of FIG. 1.

Hinges or folds 34, 36, and 38 allow first web 30 of gasket 10 to be folded adjacent body or base 28 and second web 32 to be folded adjacent first web 30 so that first web 30 lies between second web 32 and body or base 28 as shown in FIG. 3. Folding first and second webs 30 and 32 allows sleeve 22 to be protected from damage during shipping and handling of manhole 14.

A recess 52, best shown in FIG. 2, captures abutment member 50 when first and second webs 30 and 32 are in the position shown in FIG. 3 to help retain sleeve 22 in the folded position. First and second webs 30 and 32 of sleeve 22 are easily unfolded in the direction of large arrows 51 and 53 by manually releasing abutment member 50 from recess 52. As shown in FIG. 3, sides 54 and 56 and face 58 of recess 52 are formed so as to substantially conform to the dimensions of abutment member 50.

Gasket 10 is formed so that when sleeve 22 is folded, body 28 is in tension, second web 32 is in compression, and first web 30 is generally in equilibrium (i.e., neither in tension nor compression). This physical state helps assure that sleeve 22 will form a snug fit around the outer wall or surface of a pipe when webs 30 and 32 are unfolded while, at the same time, still allowing a pipe to be inserted through sleeve 22.

In preferred embodiments, body 28 of gasket 10 is configured to have a length substantially equal to the width of manhole wall 40 against which body 28 lies adjacent. This helps prevent settable material from which wall 40 and manhole 14 are made from entering gasket 10 during casting.

Figure 4:
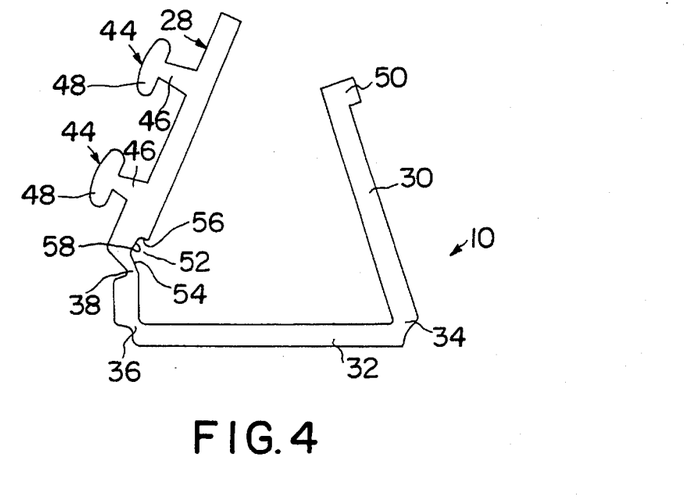
FIG. 4 is an end view of the position assumed by the gasket of the present invention when extruded.

Gasket 10 of the present invention is made by extruding an elastomeric material through an extrusion die to create a gasket profile as shown in FIG. 4. Extruding gasket 10 allows any diameter sleeved embedded gasket to be economically made as compared to conventional gaskets with sleeves or boots that require separate molds for different diameter sizes.

Gasket 10 is extruded in the shape shown in FIG. 4 so as to be at an approximate midpoint between folded and unfolded positions. Extruding gasket 10 in this shape helps divide the stress that hinges or folds 34, 36, and 38 experience when sleeve or boot 22 is folded and unfolded. For example, if gasket 10 were extruded flat, hinges 34, 36, and 38 would experience a greater stress when sleeve 22 is folded than they do when a sleeve 22 of a gasket 10, extruded in the profile shown in FIG. 4, is folded.

As can be seen in FIG. 4, hinges or folds 34, 36 and 38 are made from enervations in first and second webs 30 and 32 and body 28. That is, hinges 34, 36 and 38 are formed by reducing the material thickness of the elastomer from which gasket 10 is formed at these points.

Figure 5:
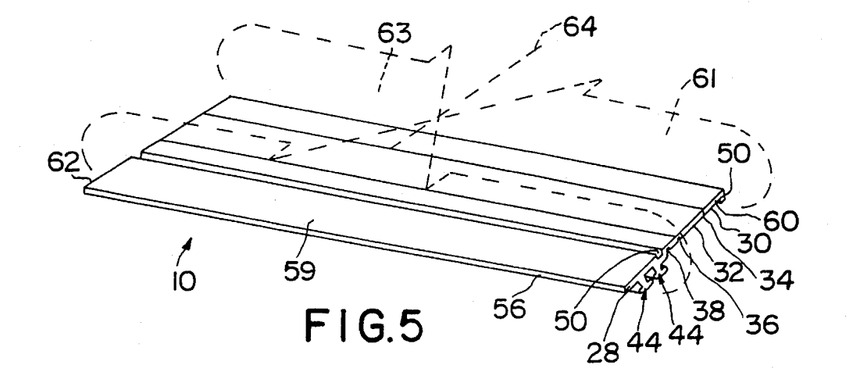
FIG. 5 is a perspective view of a length of the extruded gasket being formed into an annular ring.

Subsequent to extrusion, gasket 10 is laid substantially flat in the position shown in FIG. 5. Gasket 10 is formed into an annular shape by cutting a predetermined length of the extruded material into a sheet 59 as shown in FIG. 5. In preferred embodiments, sheet 59 is cut to a length generally equal to the circumference (i.e., outside diameter) of outer wall or surface 16 of pipe 18. Cutting sheet 59 this length helps ensure that it will securely engage outer wall or surface 16 of pipe 18 while, at the same time, still allow pipe 18 to be inserted.

Figure 6:
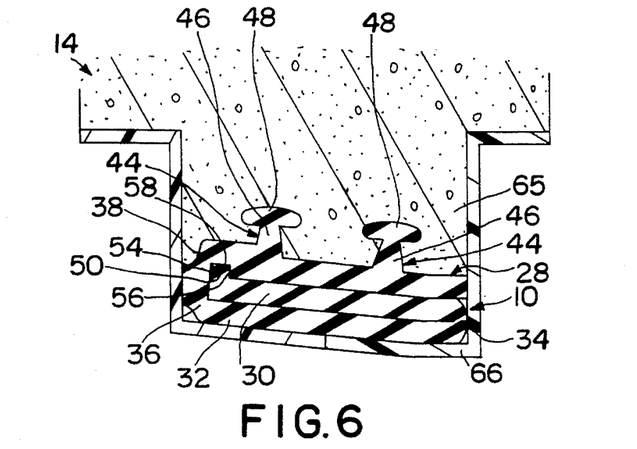
FIG. 6 is a cross-sectional view of the gasket of the present invention being cast within the wall of an manhole via a support plug.

First and second ends 60 and 62 of sheet 59 are brought together in the direction of large arrows 61 and 63 to confront one another along line 64. First and second ends 60 and 62 are then joined together by conventional means such as vulcanization. Gasket 10 is in tension when formed in this annular shape. Gasket 10 is next folded and embedded within a wall 65 defining an opening in manhole 14 during the casting of manhole wall 65 as shown in FIG. 6. FIG. 6 shows annular folded gasket 10 inserted within a fiberglass support plug 66 which is used to form a manhole opening in wall 65. Settable material such as concrete is poured into plug 66 and allowed to cure to become hard. Subsequent to curing, support plug 66 is removed and gasket 10 remains in the folded position. Sleeve 22 can then be released and unfolded in an outward direction away from body 28. Pipe 18 can then be inserted into gasket 10 and manhole opening 42, as discussed above, to seal the joint between outer surface or wall 18 and manhole wall 65.

Figure 7:
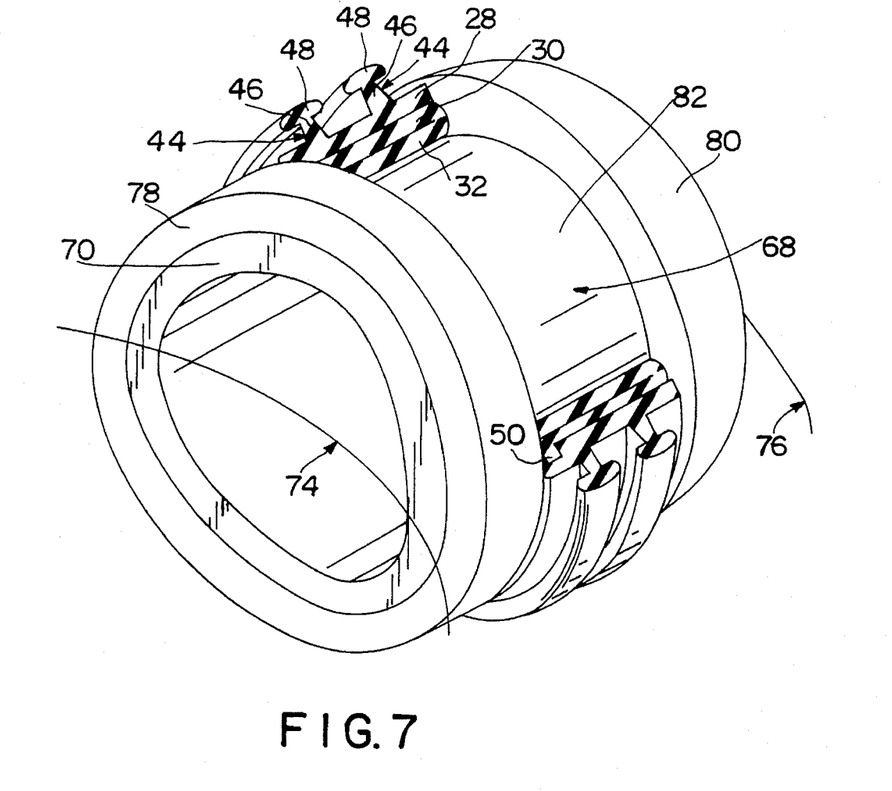
FIG. 7 is a perspective view of a method of casting the gasket of the present invention within the wall of a manhole using a cut pipe section with formed ends and a pair of spacers.
Figure 8:
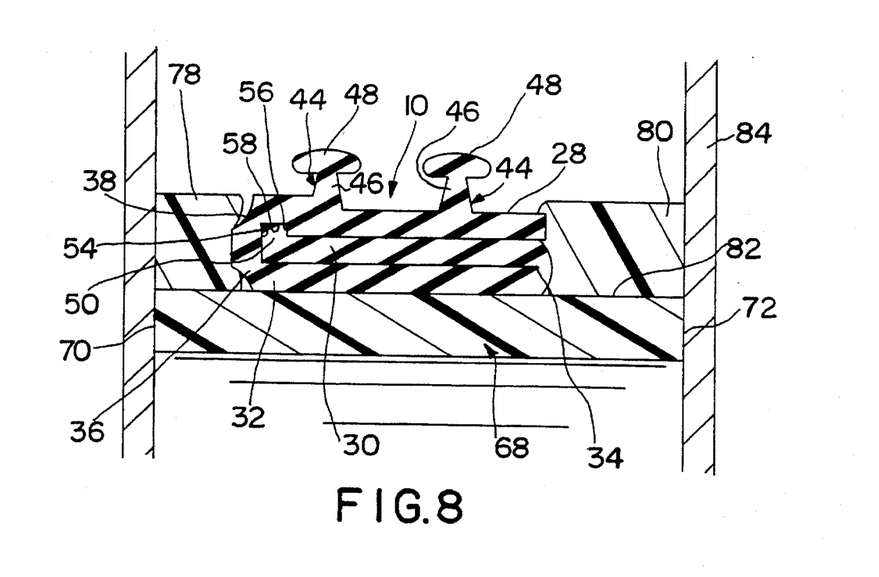
FIG. 8 is a cross-sectional view of the cut pipe section with formed ends and spacers positioned within a manhole wall mold which are used as part of the method to cast the gasket of the invention within the wall of a manhole.

Fiberglass support plugs such as support plug 66, are relatively expensive to make and often in limited supply. This, combined with the amount of time required to properly position and align plug 66 and cure settable material, makes mass production of manhole walls with cast-in annular gaskets difficult and expensive. FIGS. 7 and 8 show an alternative method for casting gasket 10 within a wall of manhole 14 that addresses these expense and mass production problems. This method is particularly suitable for rapid field installation of gasket 10.

FIG. 7 shows a pipe section 68 cut a predetermined length and having first and second ends 70 and 72 (see FIG. 8). First and second ends 70 and 72 are respectively cut to generally conform with arcs 74 and 76 which substantially follow respective inside and outside diameters of manhole 14. In a preferred form of the method, pipe section 68 is made from a standard available plastic pipe, such as PVC pipe, that is commonly used in sewer systems. Spacers 78 and 80 are placed on outer surface or wall 82 of pipe section 68 adjacent respective first and second ends 70 and 72. Folded annular gasket 10 is then placed on outer wall or surface 82 between spacers 78 and 80. As shown in FIGS. 7 and 8, gasket 10 would be cast within manhole 14 so that sleeve 22 opened into manhole 14. It is preferred, however, to have sleeve 22 unfold outside of manhole 14 so that clamp 20 is not as directly exposed to moisture as it would be inside manhole 14, which can accelerate deterioration of clamp 20.

The assembly shown in FIG. 7 is next placed within manhole wall mold 84 as shown in FIG. 8. Settable material, such as concrete, is then poured into mold 84 and allowed to cure so as to become hard. Pipe section 68 is cut a predetermined length so that first and second ends 70 and 72 adjoin mold 84 to help reduce bleed-by of settable material. Subsequent to curing, mold 84, pipe section 68, and spacers 78 and 80 are removed so that gasket 10 is cast within a formed manhole wall in a folded position. The positioning of gasket 10 within the manhole wall is controlled by the relative thicknesses of spacers 78 and 80. As shown in FIG. 8, gasket 10 is embedded generally in the center of a manhole wall. Although two spacers 78 and 80 are shown, it is possible to practice the method through the utilization of only a single spacer or, alternatively, through the use of more than two spacers. Preferred materials for spacers 78 and 80 include foam water pipe insulation, rubber hose, foam tape, and other suitable compression materials.

The gasket of the present invention can be formed with a variety of different sleeve lengths. For example, in preferred embodiments, gasket 10 shown in FIGS. 1–6 has a sleeve length of approximately eight inches. Another preferred embodiment of the present invention having a sleeve length of approximately five inches is shown in FIGS. 9 and 10.

Figure 9:
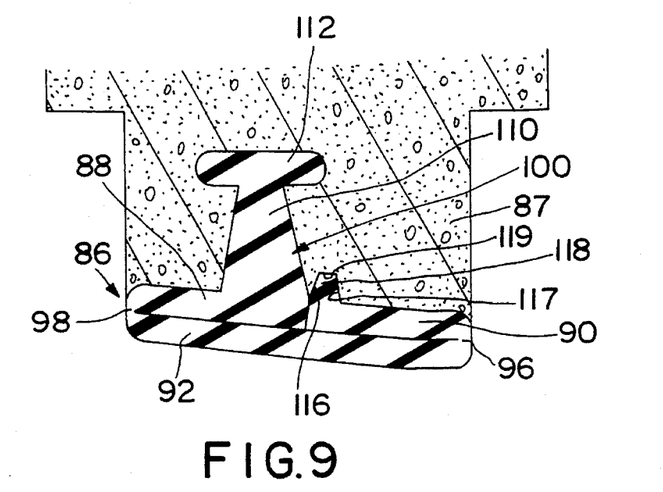
FIG. 9 is a cross-sectional view through a wall of a manhole showing an alternative embodiment of the gasket of the present invention folded to lie adjacent the wall.
Figure 10:
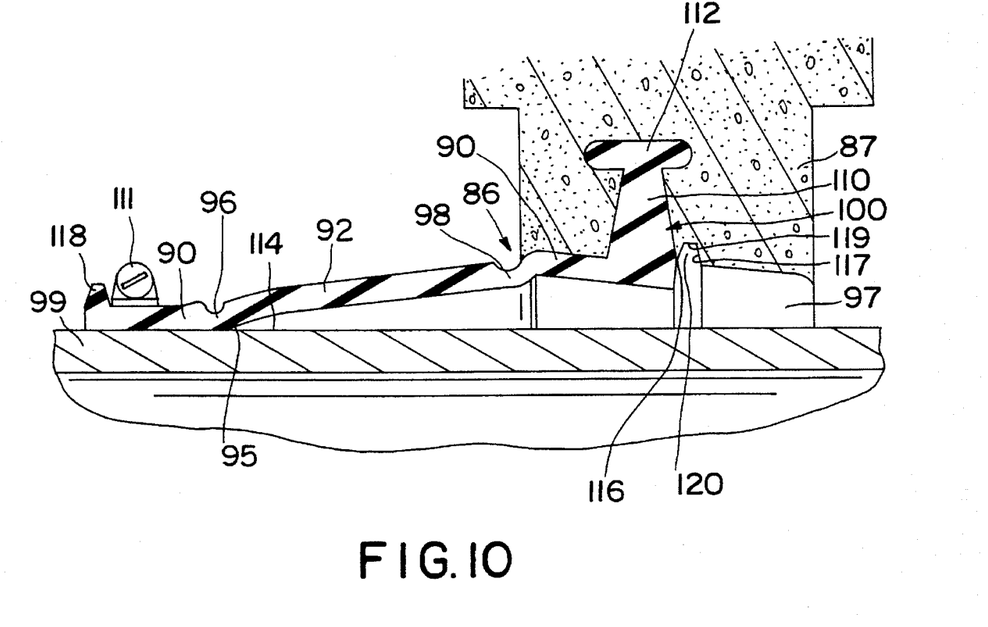
FIG. 10 is a cross-sectional view of the gasket of FIG. 9 in an unfolded position sealing a joint between the wall of the manhole and an outer wall or surface of a pipe inserted within the gasket and opening in the manhole defined by the wall of the manhole.

FIG. 9 shows an annular gasket 86 cast within manhole wall 87. Gasket 86 includes an annular body or base 88 and an annular first and second webs or skirts 90 and 92 that are connected to each other and body 88. First and second webs 90 and 92, together, form a sleeve 95 as shown in FIG. 10. A hinge or fold 96 couples first web 90 to second web 92 and a hinge or fold 98 couples second web 92 to body 88. Hinges or folds 96 and 98 allow first and second webs 90 and 92 of sleeve 95 to be unfolded and folded as respectively shown in FIGS. 9 and 10. As discussed above, folding of sleeve 95 protects it during shipping and handling prior to installation of a pipe 99 within manhole opening 97. As shown in FIG. 9, first web 90 is adjacent both body 88 and wall 87 and second web 92 is adjacent both body 88 and first web 90 when sleeve 95 is in the folded position.

A keylock or anchoring projection 100 is formed on and projects away from body 88 to secure gasket 86 within a manhole wall 87. Keylock 100 includes a leg 110 coupled on one end to and projecting away from body 88. A flange 112 is formed on a distal end of leg 110. Keylock 100 helps anchor gasket 86 within the settable material from which manhole wall 87 is formed.

A clamp 111 is secured against lateral movement along sleeve 95 by an abutment member 118 formed on a distal end of first web 92. In preferred embodiments, abutment member 118 includes an annular bead. However, abutment member 118 may also include one or more raised beads formed on first web 92. Clamp 111 secures sleeve 95 so that it effects a positive, substantially fluid-tight seal between wall 87 and outer surface or wall 114 of pipe 99.

A recess 120 is formed in wall 87 as shown in FIG. 9. Recess 120 helps retain gasket 86 in a folded position so that it is protected during shipping and handling. In order to unfold gasket 86, abutment member 118 must be manually released from recess 120. Recess 120 includes first and second sides 116 and 117 and a face 119. Sides 116 and 117 as well as face 119 substantially conform to the dimensions of abutment member 118 as shown.

Gasket 86 is extruded in one piece and formed in an annular shape in the same manner as gasket 10 which is illustrated in FIGS. 4 and 5. In addition, gasket 86 may be embedded or cast within a manhole wall by either the conventional method illustrated in FIG. 6 or the method of the present invention illustrated in FIGS. 7 and 8.

Figure 11:
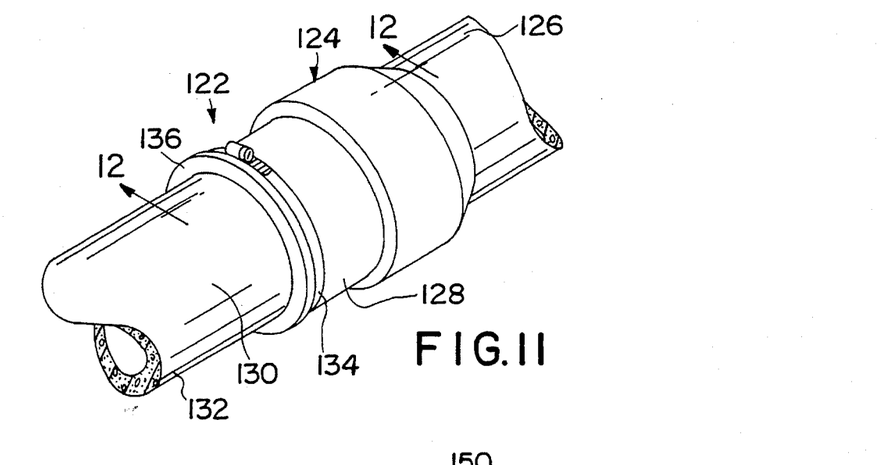
FIG. 11 is a perspective view of an unfolded gasket of the present invention sealing a joint between a bell end of a first pipe and a spigot end of a second pipe.

The present invention can also be used to seal a joint between an outer surface of a bell end and an inner surface of a spigot end of two interconnecting pipes. FIG. 11 shows a gasket 122 of the present invention cast within a bell end 124 of a first pipe 126. Gasket 122 includes a sleeve 128 that surrounds a portion of an outer wall or surface 130 of a second pipe 132 having a spigot end (not shown in FIG. 11). A clamp 134 secures sleeve 128 against outer wall 130 of second pipe 132. An annular abutment member 136 formed on sleeve 128 secures clamp 134 against lateral movement.

Figure 12:
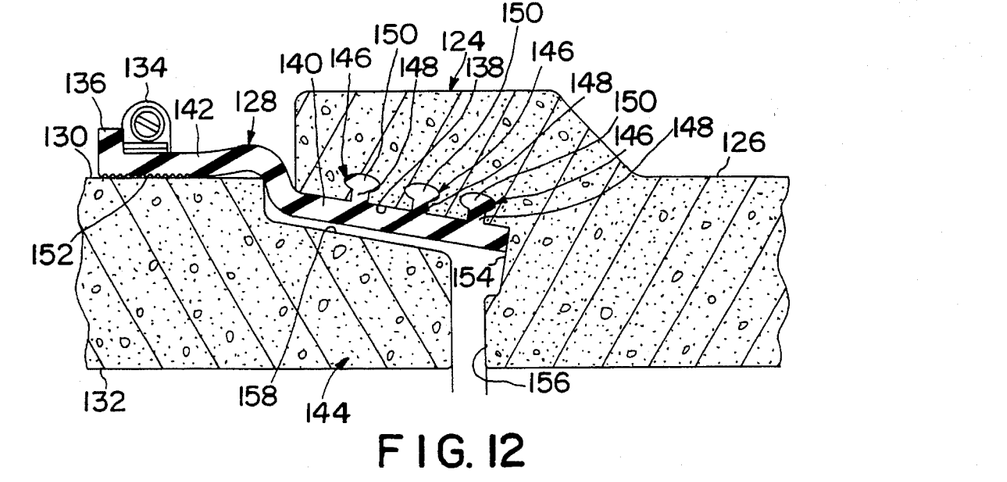
FIG. 12 is a cross-sectional view of the gasket of the present invention cast within an inner wall of the bell end of the first pipe and sealing the joint between the bell end of the first pipe and the spigot end of the second pipe positioned within an opening in the bell end defined by the inner wall taken along line 12—12 of FIG. 11.

Gasket 122 of the present invention is shown in cross-section in FIG. 12 sealing the joint between bell end 124 of first pipe 126 and spigot end 144 of second pipe 132. Gasket 122 includes an annular body 140 and an integral annular sheet 142. Body 140 is cast within inner wall 138 of bell end 124 of first pipe 126 and secured therein via anchoring projections of keylocks 146. Keylocks 146 include a leg 148 that is coupled to and radially extends from body 140. A flange is formed on a distal end of leg 148. Annular sheet 142 is formed to include a plurality of notches 152 that engage outer wall or surface 130 of second pipe 132 when sheet 142 is secured via hose clamp 134 around outer wall 130.

Annular sheet 142 of gasket 122 can be folded adjacent body 140 and secured within a recess 154 formed in shoulder 156 of bell end 124. Recess 154 helps retain sheet 142 in the folded position to help protect gasket 138 during shipping and handling. Recess 154 is formed in shoulder 156 when gasket 122 is cast within bell end 124. Recess 154 is configured to have dimensions that substantially conform to that portion of abutment member 136 and sheet 142 positioned to lie therein.

Body 140 lies between inner wall 138 of bell end 124 and relieved surface portion 158 of spigot end 144. In addition, sheet 142 surrounds outer wall or surface 130 of second pipe 132. Gasket 122 thus provides a positive, substantially fluid-tight seal between bell end 124 and outer wall or surface 130 of second pipe 132. This substantial sealing makes gasket 122 well-suited for use with both non-precision pipe joints as well as precision pipe joints that have come out of alignment. Use of gasket 122 for non-precision joints provides a better seal than the mortar or caulking that is typically used. Use of gasket 122 for precision joints provides a better seal for these joints which may come out of tolerance over time. In addition, gasket 122 provides a quick and efficient method of effecting an additional seal in a conventional gasketed pipe joint for critical applications because only an external clamp 134 and associated manual clamping operation are necessary.

Gasket 122 of the present invention may be extruded or formed in a mold. As discussed above, gasket 122 is less expensive to make when extruded.

Figure 13:
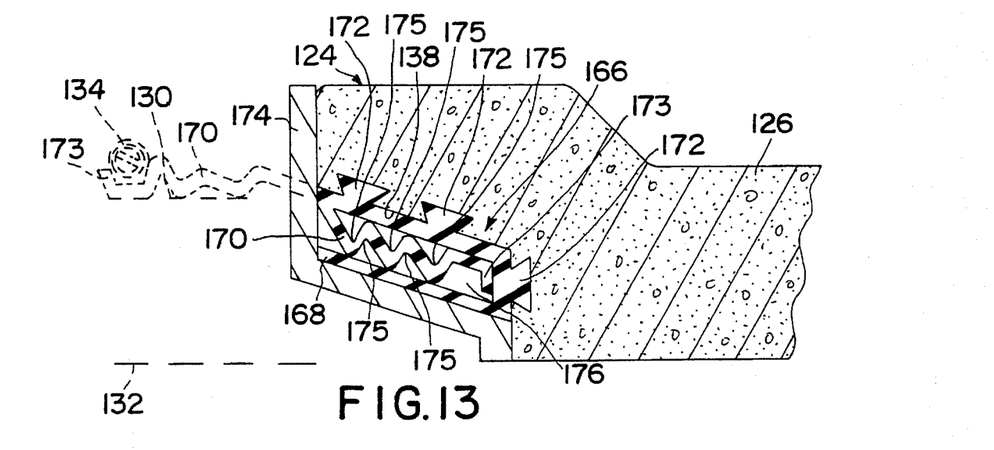
FIG. 13 is a cross-sectional view of an alternative embodiment of the gasket of the present invention cast within an inner wall of a bell end of a first pipe and utilizing a receptacle and integral folding and unfolding sleeve to seal a joint between the bell end of the first pipe and a spigot end of a second pipe.

FIG. 13 shows an alternative embodiment of a gasket 166 of the present invention cast within an inner wall 138 of bell end 124 of first pipe 126. In this embodiment, gasket 166 includes a receptacle 168 and a sleeve 170. Receptacle 168 is mounted or secured to bell end 124 via keylocks or anchoring projections 172 which engage the settable material, such as concrete, from which bell end 124 is formed. As shown in FIG. 13, keylocks 172 are of a generally trapezoidal shape. Other shapes, however, are possible as long as these shapes are effective in securing receptacle 168 within bell end 124.

A mold 174 used to cast bell end 124 and gasket 166 therein is shown in FIG. 13. Subsequent to curing of the settable material from which bell end 124 is formed, mold 174 is removed so that first pipe 126 can be connected to second pipe 132 as discussed above.

Receptacle 168, sleeve 170, and keylocks 172 are integrally formed from an elastomeric material in either an extrusion die or in a mold. Sleeve 170 includes a plurality of folds 175 that allow sleeve 170 to be moved between a folded position within a cavity 176 defined by receptacle 168 and an unfolded, clamped position around an outer wall or surface 130 of a second pipe 132 as shown in outline in FIG. 13. An abutment member 173 on a distal end of sleeve 170 helps retain clamp 134 against lateral movement along sleeve 170.

Figure 14A:
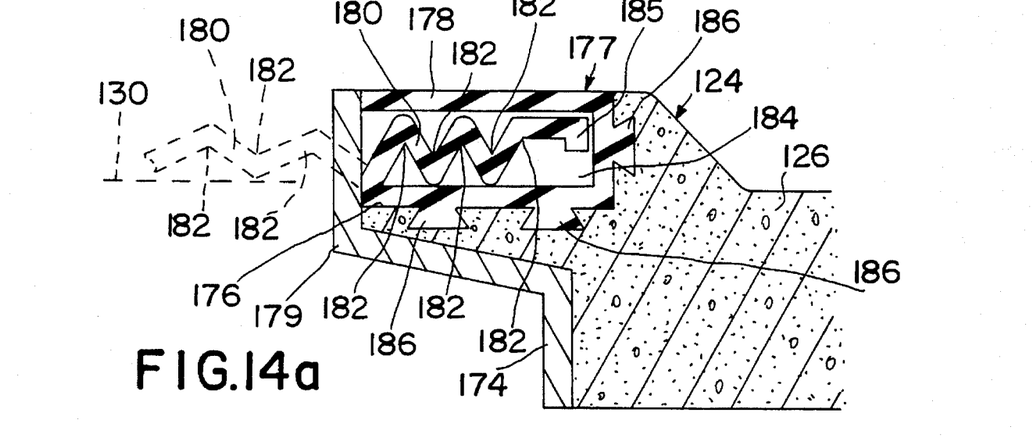
FIGS. 14a–14e illustrate cross-sectional views through the bell end of a first pipe of alternative embodiments of the gasket of the present invention that are cast in an outer wall of the bell end of the first pipe to seal the joint between the bell end and a spigot end of a second pipe.

FIGS. 14a–14e illustrate alternative embodiments for the gasket of the present invention when cast in an outer wall 176 of bell end 124 of first pipe 126. FIG. 14a shows a gasket 177 of the present invention that includes a receptacle 178 integrally formed with a sleeve 180 having a plurality of folds 182 formed therein. Sleeve 180 can be moved between a folded position within a cavity 184 defined by receptacle 178 and an unfolded position shown in outline around outer wall or surface 130 of second pipe 132. An abutment member 185 on a distal end of sleeve 180 helps retain a clamp on sleeve 180 when in the unfolded position. Receptacle 178 is secured in bell end 124 via a plurality of integral anchoring projections or keylocks 186 as discussed above. A mold 179 used to form bell end 124 and cast gasket 177 therein is also shown.

Figure 14B:
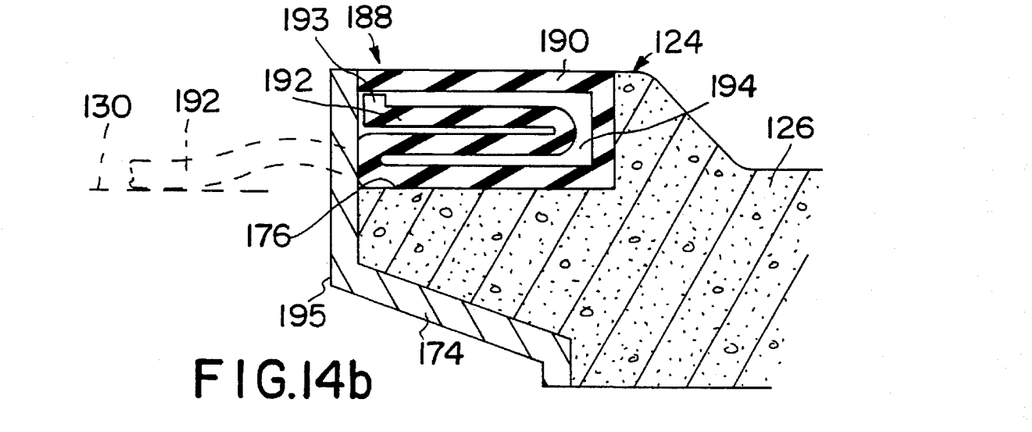

FIG. 14b shows a gasket 188 of the present invention that includes a receptacle 190 and an integral sleeve 192 that is movable between a folded position within a cavity 194 defined by receptacle 190 and unfolded around an outer wall or surface 130 of a second pipe 132 as shown in outline. An abutment member 193 on a distal end of sleeve 192 helps retain a clamp on sleeve 192 when in the unfolded position. A mold 195 used to form bell end 124 and cast gasket 188 therein is also shown.

Figure 14C:
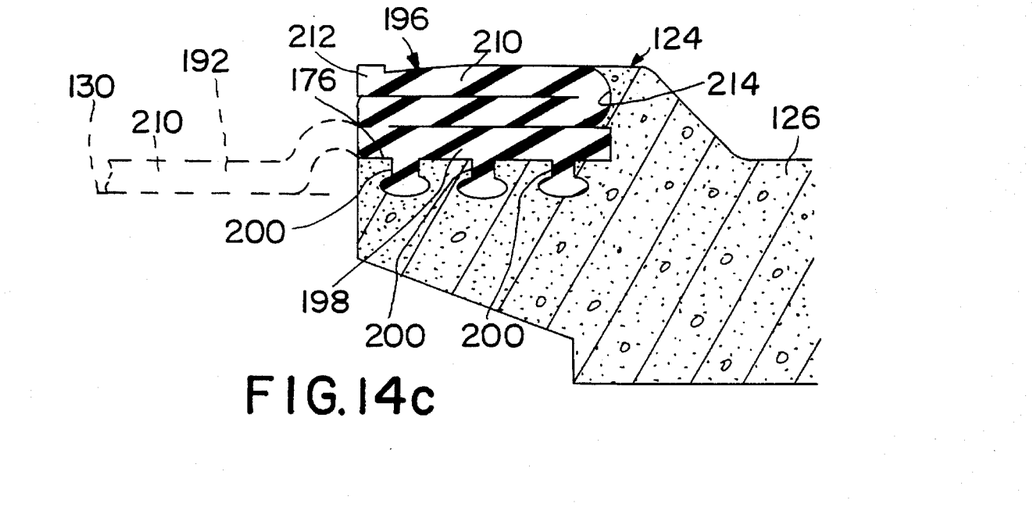

FIG. 14c shows a gasket 196 that includes a body 198 secured in outer wall 176 of bell end 124 by a plurality of integral anchoring projections or keylocks 200. An integral sleeve 210 is coupled to body 198 so as to be movable between a folded position adjacent body 198 and an unfolded position shown in outline around outer wall or surface 130 of second pipe 132. An abutment member 212 on a distal end of sleeve 192 helps retain a clamp on sleeve 210 when in the unfolded position. A recess 214 is formed in bell end 124 to help retain sleeve 210 of gasket 196 in the folded position to reduce damage to gasket 196 during shipping and handling. Sleeve 210 must be manually released from recess 214 in order to be unfolded.

Figure 14D:
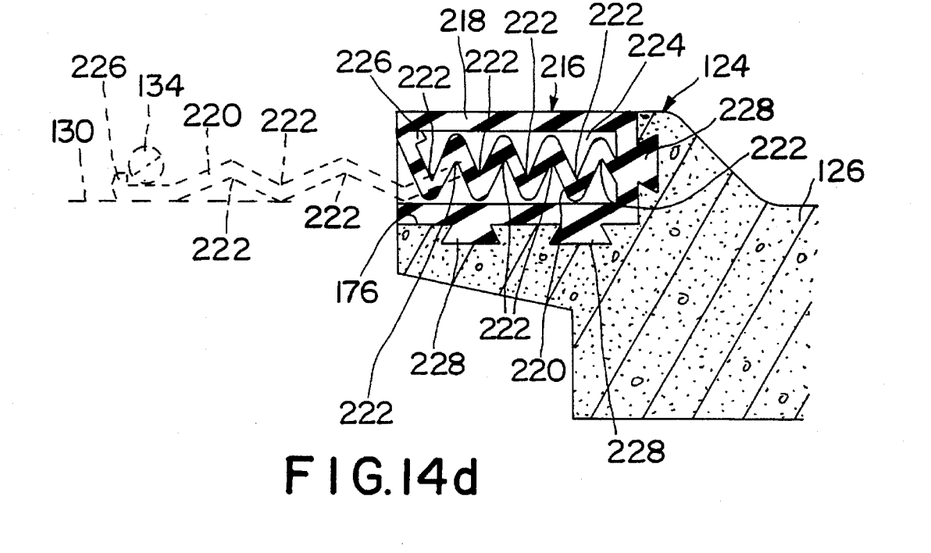

FIG. 14d shows a gasket 216 that includes a receptacle 218 and an integral sheet 220 having a plurality of folds 222. Sheet 220 is movable between a folded position inside cavity 224 defined by receptacle 218 and an unfolded position shown in outline around an outer wall of surface 130 of second pipe 132. An abutment member 226 on a distal end of sheet 220 helps retain a clamp on sheet 220 when in the unfolded position. A plurality of integral anchoring projections or keylocks 228 secure receptacle 218 within bell end 124 as discussed above. As discussed above, although keylocks 228 and shown as having a trapezoidal shape, other geometries are possible.

Figure 14E:
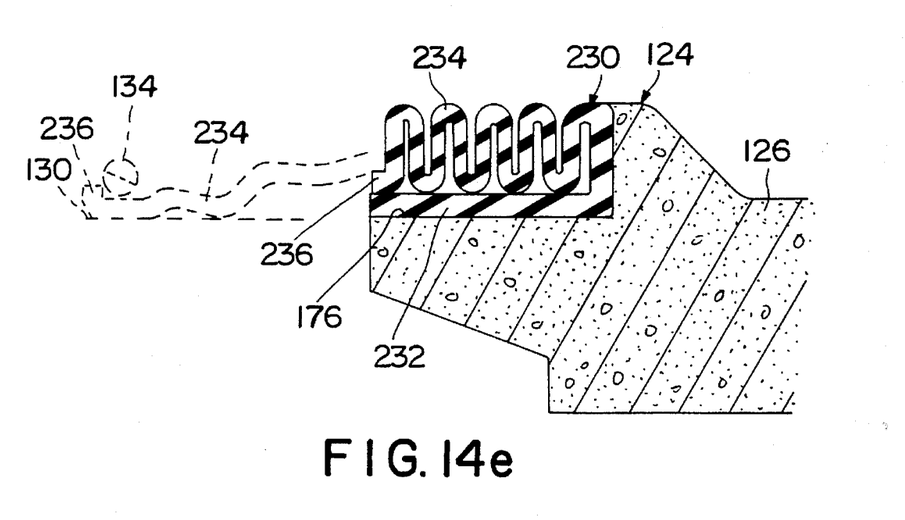

FIG. 14e shows a gasket 230 that includes a base or body 232 and an integral sleeve 234 that can be moved between a folded position adjacent body 232 and an unfolded, clamped position around outer wall 130 of second pipe 132 as shown in outline. An abutment member 236 on a distal end of sleeve 234 helps retain a clamp on sleeve 234 when in the unfolded position.

Gaskets 177, 188, 196, 216, and 230 of the present invention may be extruded or formed in a mold. As discussed above, gaskets 177, 188, 196,216, and 230 are less expensive to make when extruded.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An annular gasket for sealing a joint between an outer surface of a pipe and a wall defining an opening, comprising:
   an annular base;
   means for anchoring the base within the wall so that the base lies adjacent the wall;
   an annular first web;
   an annular second web coupled to the base and the first web; and
   means for folding the first and second webs to second web and the second web to the base so that the first and second webs are movable between a fixed position in which the first web lies between the base and the second web and for unfolding the first and second webs from the fixed position to form a sleeve around the outer surface of the pipe, the second web lying between the first web and the base when the first and second webs are unfolded.

2. The gasket of claim 1, wherein the first web is integral with the second web and the second web is integral with the base.

3. The gasket of claim 2, wherein the folding means includes a hinge between the first and second webs and a hinge between the second web and the base.

4. The gasket of claim 1, wherein the first web is laterally adjacent the base in the folded position and the second web is adjacent the base and first web in the folded position.

5. The gasket of claim 1, further comprising abutment means on the first web for retaining a clamp on the sleeve.

6. The gasket of claim 5, wherein the abutment means includes a bead adjacent a distal end of the first web.

7. The gasket of claim 5, wherein the base is configured to include means for capturing the abutment means to lock the first and second webs in the folded position so that the abutment means must be removed from the capturing means to unfold the first and second webs.

8. The gasket of claim 7, wherein the capturing means includes a recess formed in the base and configured to have dimensions generally conforming to that of the abutment means.

9. A concrete manhole structure, comprising:
   a wall defining an annular opening through which an annular pipe having an outer surface can pass so that a joint is defined between the wall and the outer surface;
   an annular body positioned to lie in the joint between the wall and outer surface;
   means for anchoring the body within the wall so that the body lies adjacent the wall;
   a sleeve having first and second folds;
   means for coupling the sleeve to the body so that the sleeve is movable between a folded position adjacent the body and an unfolded position around the outer surface of the pipe; and
   means for securing the sleeve in the folded position.

10. The concrete manhole structure of claim 9, wherein the sleeve is unfolded on an interior of the manhole structure.

11. The concrete manhole structure of claim 9, wherein the wall has a first width and a second width greater than the first width and the body is configured to extend along the first width of the wall.

12. The concrete manhole structure of claim 9, wherein the first and second folds of the sleeve define first and second skirts, the first skirt adjoining the body and lying between the second skirt and the body when the sleeve is in the folded position and the second skirt lying laterally between the first skirt and the body when the sleeve is in the unfolded position.

13. The concrete manhole structure of claim 9, wherein the first and second folds of the sleeve define first and second skirts, the first skirt lying adjacent the body and wall when the sleeve is in the folded position and the second skirt lying laterally between the first skirt and the body when the sleeve is in the unfolded position.

14. The concrete manhole structure of claim 9, wherein the sleeve is integral with the body.

15. The concrete manhole structure of claim 14, wherein the folds of the sleeve and the coupling means include hinges.

16. The concrete manhole structure of claim 15, wherein the hinges include reduced portions in the sleeve and the body.

17. The concrete manhole structure of claim 9, wherein the securing means includes an abutment member on a distal end of the sleeve for retaining a clamp on the sleeve when the sleeve is in the unfolded position.

18. The concrete manhole structure of claim 17, wherein the abutment means includes a bead.

19. The concrete manhole structure of claim 17, wherein the securing means further includes means for capturing the abutment member to secure the sleeve in the folded position so that the abutment member must be removed from the capturing means to unfold the sleeve.

20. The concrete manhole structure of claim 19, wherein the capturing means includes a recess formed in the body and configured to have dimensions generally conforming to that of the abutment member.

21. The concrete manhole structure of claim 17, wherein the wall is configured to include means for capturing the abutment means to lock the sleeve in the folded position so that the abutment means must be removed from the capturing means to unfold the sleeve.

22. The concrete manhole structure of claim 21, wherein the capturing means includes a recess formed in the wall and configured to have dimensions generally conforming to that of the abutment means.

23. A gasket for sealing a joint between an outer surface of a pipe and a wall defining an opening, comprising:

an annular sheet;

first and second enervations formed in the sheet, the sheet being foldable along the first and second enervations;

means coupled to the sheet for anchoring the sheet within the wall; and means for securing the sheet in a folded position adjacent the wall.

24. The gasket of claim 23, wherein the securing means includes a bead formed on an end of the sheet and a recess in the sheet sized to receive the annular bead when the sheet is in the folded position.

25. A pipe structure, comprising:

a first pipe configured to include a bell end;

an annular sheet, the sheet being configured to fold adjacent the bell end of the first pipe and unfold around an outer surface of a second pipe to seal a connection between the first and second pipes;

means for anchoring the sheet within a wall of the bell end of the first pipe; and means on the sheet for securing the sheet adjacent the bell end of the first pipe when folded.

26. The pipe structure of claim 25, wherein the sheet seals the connection defined between the wall and a portion of the outer surface of the second pipe.

27. The pipe structure of claim 25, wherein the sheet is configured to include notches that adjoin the outer surface of the second pipe in the unfolded position.

28. The pipe structure of claim 25, wherein the anchoring means includes a receptacle and the sleeve is cantilevered on an end to the receptacle.

29. The pipe structure of claim 28, wherein a distal end of the sleeve is configured to include abutment means for retaining a clamp on the sleeve in the unfolded position.

30. The pipe structure of claim 29, wherein the abutment means includes a bead.

31. The pipe structure of claim 28, wherein the receptacle and unfolded sleeve seal the joint defined between the wall and a portion of the outer surface of the second pipe.

32. The pipe structure of claim 28, wherein the receptacle and sleeve are integral.

33. The gasket of claim 3, wherein the folding means additionally includes a second hinge between the second web and the base.

34. The pipe structure of claim 25, wherein the securing means includes a bead formed on an end of the sheet and a recess in the sheet sized to receive the bead when the sheet is in the folded position.

* * * * *